Feb. 8, 1955         E. J. HAMMES         2,701,855
REVERSIBLE MOTOR AND SWITCH FOR GARBAGE DISPOSAL UNITS
Filed Jan. 30, 1953         2 Sheets-Sheet 1
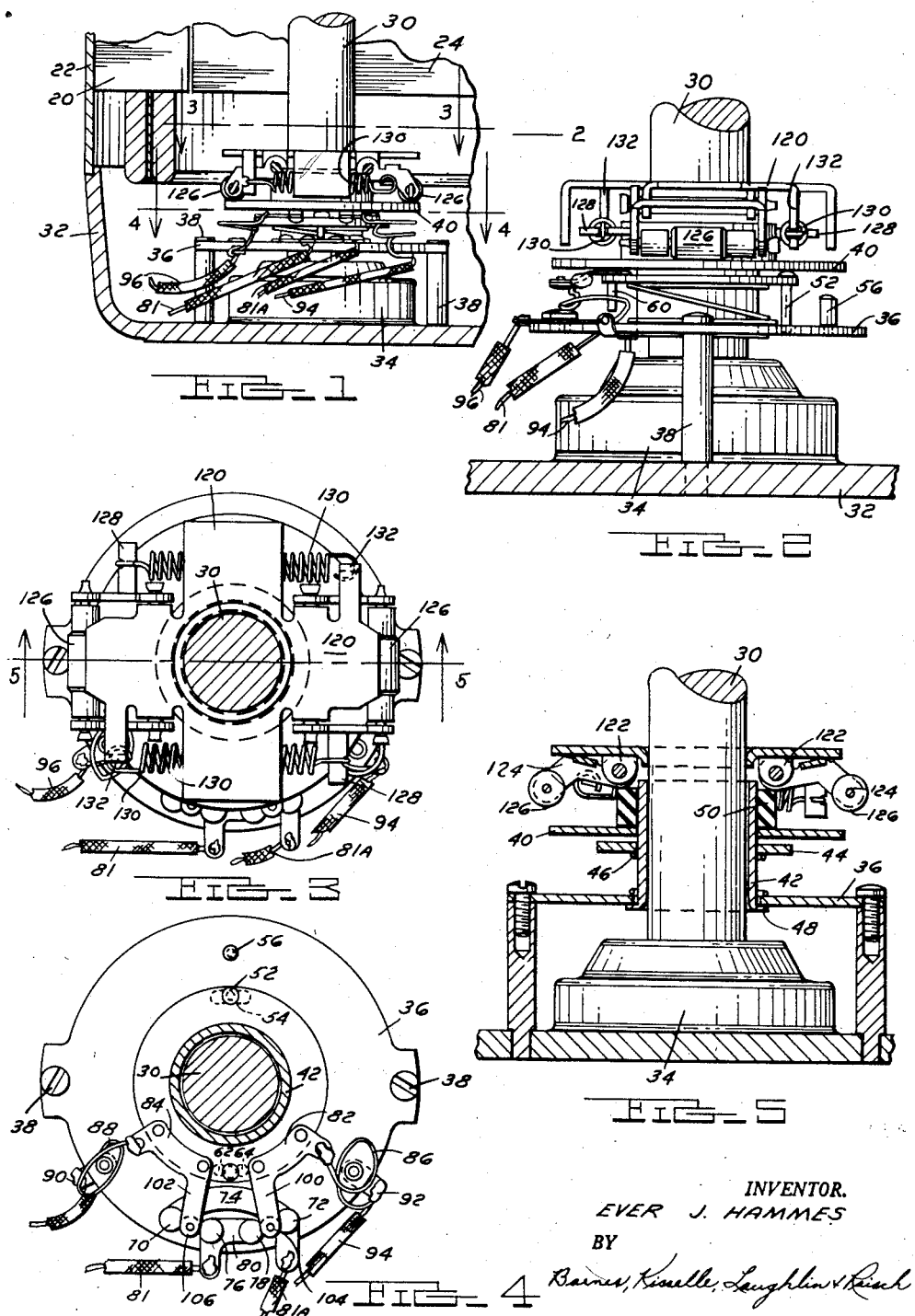
INVENTOR.
EVER J. HAMMES
BY
ATTORNEYS Feb. 8, 1955 E. J. HAMMES 2,701,855
REVERSIBLE MOTOR AND SWITCH FOR GARBAGE DISPOSAL UNITS
Filed Jan. 30, 1953 2 Sheets-Sheet 2
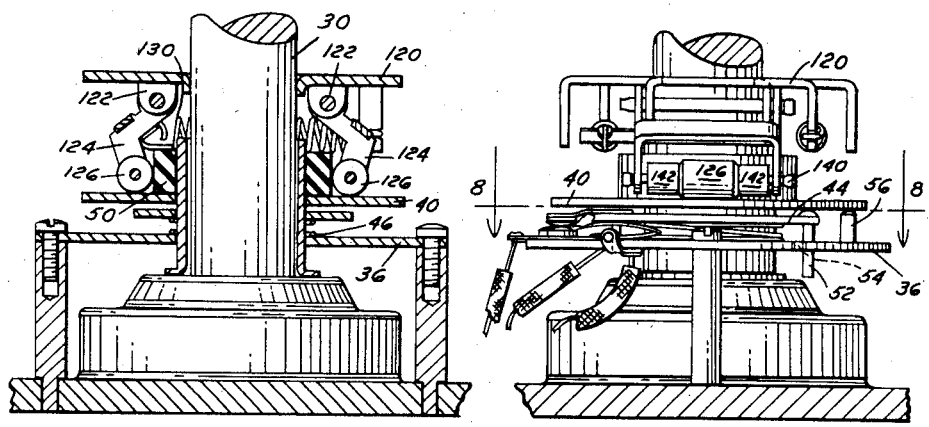
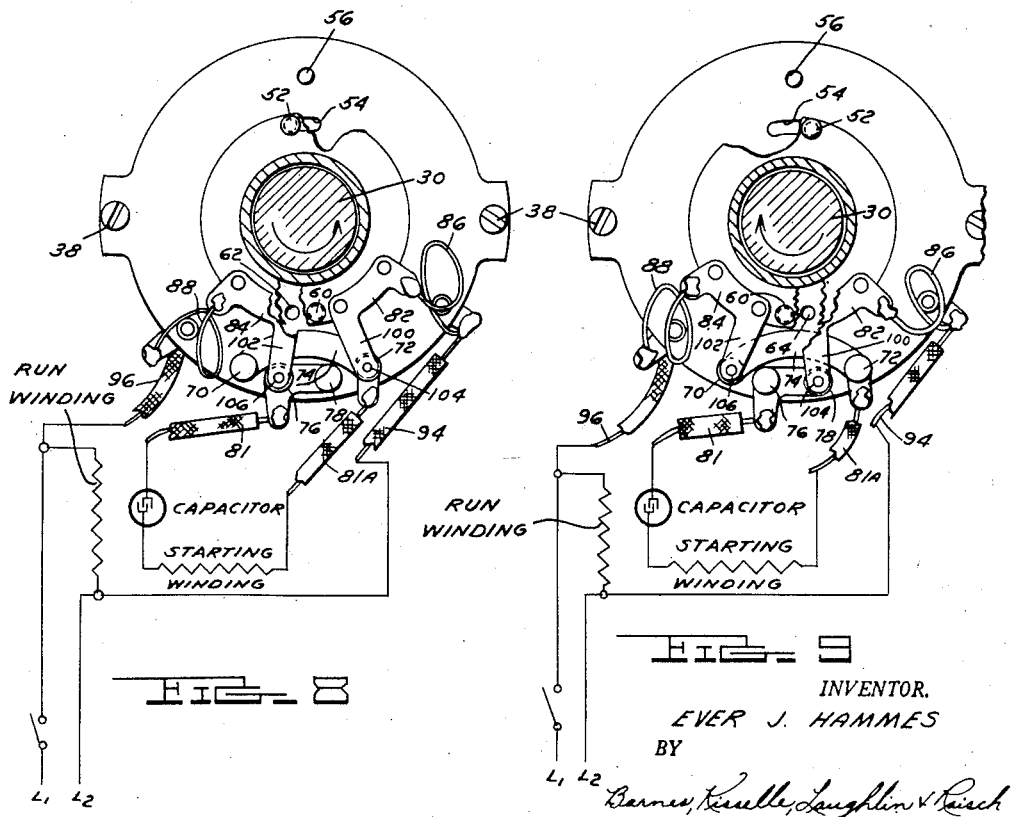
INVENTOR.
EVER J. HAMMES
BY
Barnes, Kisselle, Laughlin & Raisch
ATTORNEYS

United States Patent Office 2,701,855
Patented Feb. 8, 1955

2,701,855

REVERSIBLE MOTOR AND SWITCH FOR GARBAGE DISPOSAL UNITS

Ever J. Hammes, Racine, Wis., assignor of one-fourth to Freda Hammes, one-fourth to Quinten A. Hammes, and one-fourth to the estate of John W. Hammes Application January 30, 1953, Serial No. 334,125

10 Claims. (Cl. 318—207)

This invention relates to a garbage disposal unit and particularly to a reversing switch control for such a unit which is self-actuating.

In Hammes Patent No. 2,225,171, there is a teaching of a reversal switch for a garbage disposal unit, the object being to operate the unit in a different direction each time the switch is actuated. This has the advantage that if there is any jamming there will be a backing-off action upon actuation of the switch which will tend to free the device. Also, when double cutting edges are provided on the cutting elements, it has in effect a double life with respect to the cutting action.

It is an object of the present invention to provide a switch for an electric motor used to empower a garbage disposal unit and particularly a reversing switch for closing the starting windings of the motor for sufficient time to obtain the necessary speed to allow the motor to reduce the required torque on the main or running windings.

Other objects and features relating to the details of construction and operation will be apparent in the following description and claims.

Briefly, the invention consists of a switch composed of axially spaced plates surrounding a shaft of the motor to be controlled, these plates being relatively movable in an axial and rotative direction. A centrifugal device also associated with the shaft of the motor functions to shift these plates relative to each other, particularly in the phase of the operation when the motor is slowing down and coming to rest, the combination serving to position the plates for the next starting connection as the motor stops.

Drawings accompany the specification, and the various views thereof may be briefly described as:

Figure 1, a sectional view of a motor housing in assembly showing the switch in elevation in an open position.

Figure 2, an enlarged view of the switch taken on line 2—2 of Figure 1.

Figures 3 and 4, sectional views, respectively, on lines 3—3 and 4—4 of Figure 1.

Figure 5, a sectional view of the switch taken on line 5—5 of Figure 3.

Figure 6, a view of the switch in closed contact position.

Figure 7, a view of the switch in contact position on line 7—7 of Figure 6.

Figure 8, a plan view of a portion of the switch taken on section line 8—8 of Figure 7.

Figure 9, a view of the switch similar to Figure 8 showing the parts in different relative rotative position.

Referring to the drawings, in Figure 1 the lower portion of an induction motor is shown with a field winding 20 enclosed in a housing 22 surrounding an armature 24 mounted on a shaft 30. The end of the motor is closed by a housing 32, on the inner surface of which is a shaft journal bearing 34. The reversing switch of the present invention is mounted around the shaft 30 at this bearing end. Reference is made to my co-pending application Serial No. 310,582, filed September 20, 1952, wherein a complete disposal unit is disclosed.

The switch proper is formed by contacts on a table plate 36 fastened by posts 38 to the end housing. This table plate is mounted independently of the shaft but is circumferentially disposed with relation thereto. Mounted on the table plate 36 is a floating plate 40, this plate being annularly disposed on a sleeve 42 above a smaller collar 44. A coil spring 46 surrounds sleeve 42 and serves to exert upward pressure to hold a flanged end 48 of sleeve 42 against the table plate 36, separating the plate 36 and the floating plate 40 except as hereinafter indicated.

A resilient collar ring 50 formed preferably of rubber or a similar material is pushed onto the upper end of sleeve 42 against floating plate 40. The purpose of this ring 50 will be later described. The switch plates 36 and 40 are arranged to have limited relative rotation with respect to each other. This is controlled by a pin 52 mounted to depend from the disk collar 44 into an arcuate slot 54, see Figures 8 and 9.

A stop pin 56 limits this axial motion of the plates toward each other. Diametrically opposed to the pin 52 is another pin 60 arranged to insert into one of two spaced holes 62 or 64, see Figures 4, 8 and 9.

Table plate 36 has four contact points positioned adjacent the periphery in spaced relation: The outer two points 70 and 72 are connected by the conductive strip 74. The inner two points 76 and 78 are connected by a short conductive strip 80. These connecting points are located in the same relative positions radially from the center of the device. The inner two contact points are connected to one lead wire 81. The outer points 70, 72 are connected to a lead wire 81A.

Between the collar 44 and the upper plate 40 are two arcuate conductive strips 82 and 84, each of which is connected by wires 86 and 88 to terminal connections 90 and 92 on the lower plate 36. These connections have lead wires 94 and 96, respectively. The four lead wires may then form a circuit from the power leads to the respective ends of a starting winding, the switch being interposed to change the direction of current flowing in the winding selectively.

Radially projecting from the arcuate conductive strips 82 and 84 are legs 100 and 102, on the end of which are contact points 104 and 106 positioned radially at the same position at all times from the center as the points 70, 72, 76 and 78 on plate 36. The legs 100 and 102 are slightly resilient, and the connecting wires 86 and 88 are flexible enough that they will not interfere with the relative axial or radial motion of plates 36 and 40.

With this arrangement, it is thus possible to connect the lead wires 81 and 81A to either of the lead wires 94 or 96. In the position shown in Figure 8, lead wire 81 is connected to lead wire 96 through contact points 76, 106, the conductive strip 84, and wire 88; and lead wire 81A is connected to lead wire 94 through 72, 104, 100, 82 and 86.

In Figure 9 the lead wire 81 is connected to the winding wire 94 through contact points 78 and 104, conductive strip 82, and wire 86. Similarly, wire 81A connects to wire 96 through 74, 70, 106, 102, 84 and 88. The outer points 70 and 72 also serve as balance points for the legs 100 or 102 when in contact to provide a stable switch position.

It will thus be seen that the varying connections to the starting windings of the induction motor are made by rotating plate 40 with respect to plate 36, and each time the plate 40 must be raised by the spring 46 to remove the pin 60 from one of the locating holes 62 or 64. The motion of the plate 36, therefore, and the contact points carried thereby is up, around and down and again up, around in the opposite direction and down.

The mechanism for accomplishing this rotation will next be described. This control mechanism is supported on a spider plate 120 which is mounted on and rotates with the motor shaft 30 at a position above the top plate 40 of the switch mechanism. On opposed legs of this spider 120 downward tabs 122 support swinging frames 124, each of which has mounted at the bottom portion thereof a roller 126.

Extending outwardly from each of these frames is an arm 128 for anchoring a spring 130, the other end of which is anchored on a depending lug 132 fastened to the spider plate 120. Each frame 124, therefore, is urged inwardly to the position shown in Figure 6 by the springs 130. The resilient ring 50 limits the inward motion of the rollers 126.

It will be noted also that the inward motion of the frames 124 causes a radial downward swinging of the rollers 126, which thus forces the plate 40 downward against the spring 46 and toward the plate 36. The rollers 126 are mounted on pins 140 which extend through the ends of the frames. Adjacent the rollers 126 are weight members 142, also on pins 140.

The action of centrifugal force on these rollers and weight members will tend to throw the frame member outwardly to a position shown in Figure 5, thus permitting the spring 46 to raise the plate 40. When the motor is up to speed, the plate 40 will then be in an up position clear of the rollers; and when the switch is cut off and the motor slows down, the springs 130 will gradually pull rollers 126 inwardly and downwardly, where they will rub on the plate 40 and turn the plate in the direction that the motor is operating.

When the motor comes to a stop, the rollers 126 will force the plate 40 to a contact closing position as shown in Figures 6 and 7, where the device will remain until the actuating switch of the motor, not shown, is closed.

When this switch is closed, the power will flow to the starting winding of the motor and actuate the induction motor in a specific direction which is opposite to that in which it was previously rotating. Every time the motor slows down and stops, the switch plate 40 will be positioned for the starting of the motor in the opposite direction; and as the motor is started and gains speed, the starting windings are then disconnected by the action of spring 46 on plate 40.

The motor does not have to come to a complete stop before reversal takes place. The springs are adjusted so that when the motor slows to 1150 to 1200 R. P. M., the throw out members will contact plate 40 and reverse the unit. Thus, when the device is overloaded, it will reverse enough to prevent jamming.

I claim:

1. In combination with an actuating electric motor of a garbage disposal unit, a reversing switch of the centrifugal type operable by a rotative shaft of said motor which comprises co-axial, relatively rotatable, spring-separated switch plates mounted co-axially with said shaft, electrical contact means on said plates, means to limit the relative rotation of said plates, said contact means being positioned to register in different switch relationships at the extremes of relative rotation of said plates, and means responsive to the speed and rotation of said motor shaft to move said plates toward each other to contact positions.

2. In combination with an actuating electric motor of a garbage disposal unit, a reversing switch of the centrifugal type operable by a rotative shaft of said motor which comprises co-axial, relatively rotatable, spring-separated switch plates mounted co-axially with said shaft, electrical contact means on said plates, means to limit the relative rotation of said plates, said contact means being positioned to register in different switch relationships at the extremes of relative rotation of said plates, and means responsive to the motion of said motor shaft to move said plates toward each other to contact positions and to rotate said plates relative to each other to positions dependent on the direction of rotation of said shaft.

3. In combination with an actuating electric motor of a garbage disposal unit, a reversing switch of the centrifugal type for controlling a starting winding of said motor and operable by a rotative shaft of said motor which comprises co-axial, relatively rotatable switch plates, switch contacts on said respective plates disposed for two switch positions, depending on the relative rotation between said plates, and control means responsive to rotation of said shaft positioned to actuate one of said plates toward the other to one of two contact positions dependent on the direction of operation of said shaft.

4. A device as claimed in claim 3 in which resilient means is disposed between said plates to urge the same away from each other and away from contact position except when actuated by said control means.

5. A device as defined in claim 3 in which the control means comprises a plate disposed to rotate upon rotation of said shaft, oscillatable members on said plate biased to contact with one of said switch plates in the absence of rotation of said shaft and disposed to move away from said swtich plate by the operation of centrifugal force as said shaft rotates, said oscillatable means being effective to move said switch plates toward each other and to rotate the same relative to each other in a direction dependent on the direction of rotation of the shaft.

6. A device as defined in claim 5 in which the oscillatable means comprises frames pivotally mounted at one end of said plate of the control means, the free end of said frames being weighted to be responsive to centrifugal force, and resilient means to urge said free ends to a position in contact with one of said switch plates and urging said switch plates toward each other to a contact position.

7. A device as defined in claim 6 in which the plate of the control means is mounted on and concentric with the shaft of the motor to be controlled in a manner to rotate directly with said shaft.

8. A device as defined in claim 3 in which the switch plates are limited in rotative movement by a pin on one plate moving in a slot of the other plate and in which the rotative switch positions are defined by a pin on one of said plates co-operating with one of two spaced apertures in the other of said plates.

9. A device as defined in claim 3 in which one of said switch plates is provided with four contact points and the other of said switch plates is provided with two contact points mounted on spaced resilient arms, the contact points on the first plate being related to the conductive circuit wherein both points on the second plate contact a pair of points on the first plate when the switch is actuated to any particular rotative position.

10. In combination with an actuating electric motor, a reversing switch of the centrifugal type which comprises spaced, spring-separated switch plates mounted adjacent a rotating shaft of said motor for limited relative axial and rotatable movement, switch points on said plates selectively contactable at the extreme limits of relative rotation of said plates when said plates are moved together, and automatic control means on said shaft axially movable relative thereto and responsive to the speed and rotation of said motor shaft biased to shift said plates to the two extreme contact positions selectively dependent on the direction of rotation of said shaft as it comes to rest, said means being movably responsive to centrifugal force during operation of the shaft to permit separation of said plates during rotation of said shaft.

No references cited.